Feb. 28, 1967 S. T. McCRACKEN, JR 3,306,538

FLUID TIMER

Filed Nov. 20, 1963 2 Sheets-Sheet 1

INVENTOR.

SAMUEL T. McCRACKEN, JR.

BY R H Quist

ATTORNEY

Feb. 28, 1967 S. T. McCRACKEN, JR 3,306,538

FLUID TIMER

Filed Nov. 20, 1963 2 Sheets-Sheet 2

INVENTOR.
SAMUEL T. McCRACKEN, JR.
BY R. H. Quist
ATTORNEY

United States Patent Office 3,306,538

Patented Feb. 28, 1967

3,306,538

FLUID TIMER

Samuel T. McCracken, Jr., Burlington, Vt., assignor to General Electric Company, a corporation of New York Filed Nov. 20, 1963, Ser. No. 324,992
4 Claims. (Cl. 235—201)

This invention relates to an improved fluid operated timer designed to indicate a predetermined time interval.

It is frequently desired to measure a discrete time interval to a high degree of accuracy. For example, the fuzing of the warhead of a ballistic missile may be scheduled for a particular time interval after the apogee of the flight path is reached.

Fuzing has become complicated by the existence of defensive measures designed to "jam" electronic devices. In addition, atomic radiation may cause the degradation of electronic timing devices making their use unreliable.

Fluid systems, particularly where air is the fluid, have been examined as a possible approach to a "jam proof" timing device.

United States Patent 3,093,306, entitled "Fluid-Operated Timer" and invented by Raymond W. Warren, describes a timer incorporating a fluid oscillator, a multistage fluid binary counter and a fluid AND component. An AND component is required in that timer for every three stages of the counter. A desired time interval can be measured by connecting the output of each stage to its associated AND component in a particular manner. The time measured depends upon which of the AND component output tubes is used to deliver the final fluid pulse.

Although such an arrangement for a fluid timer may be useful for some purposes, it would be desirable to eliminate the AND components and thereby achieve a more compact and uncomplicated timer.

It is, therefore, an object of this invention to provide a timer capable of being set to measure any desired time interval.

It is a further object of this invention to make such a timer without requiring the use of AND elements.

In a preferred form of the invention, a source of pressurized fluid is supplied to a multistage fluid binary counter as well as to a fluid oscillator. The oscillator is designed to deliver fluid pressure pulses at a fixed and predictable rate. These periodic pulses are received by the first stage of the multistage binary counter. Each stage of the binary counter has a single input passage together with two output passages, the output exhaust passages being part of a fluid amplifier portion of the stage. Only one of the output passages is connected to a subsequent stage of the binary counter, the other output passage merely being exhausted. Each time a fluid pulse is received by a stage of a binary counter, the flow pattern of the fluid from the pressure supply source is changed so that it moves from one output passage to the other output passage. As will be more fully described hereafter, the result is that the multistage binary counter counts in a binary manner. The output of the fluid timer is a pressure pulse of fluid from the last stage of the binary counter.

In accordance with this invention, the binary counter is provided with means for setting the flow pattern of each of its stages so that the output will initially be exiting through desired output passages. In effect, this amounts to being able to preset the binary counter to any desired time interval. If the counter is then started, it will count from the time set to the normal last count of the timer at which time the output pulse from the last counter stage of the fluid timer will be delivered. It is, therefore, possible to utilize this counter to count any number or time period within the capacity of the timer.

The invention will be better understood from the following description taken in connection with the accompanying drawings, in which.

A fluid timer in accordance with the invention will now be described with references made to FIGURE 1.

Figures 1, 2:
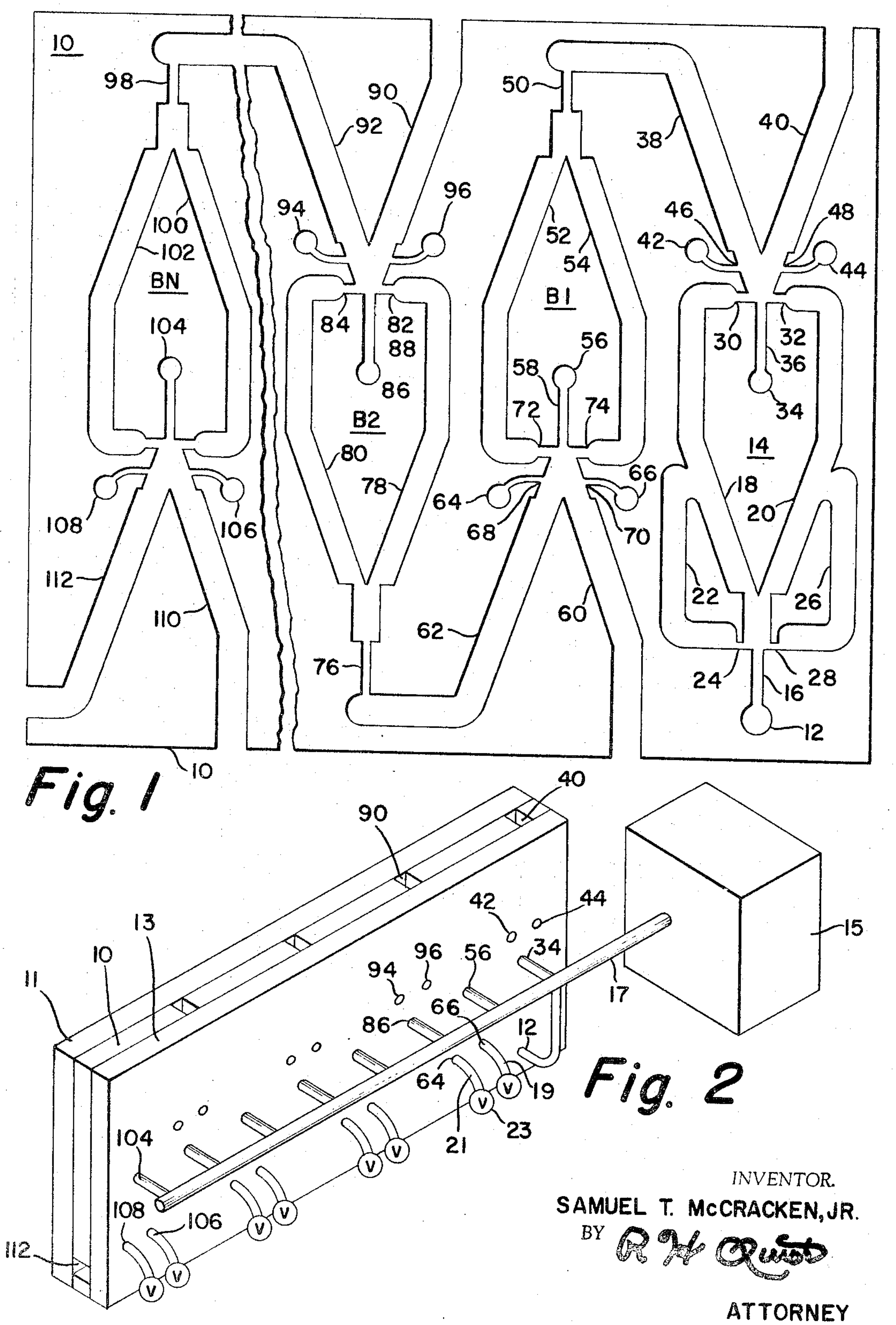
FIGURE 1 is a schematic of a fluid timer showing its operation.
FIGURE 2 is a schematic isometric of the external configuration of the timer of FIGURE 1 with a source of pressurized fluid connected thereto.

A flat sheet of material 10, such as glass or plastic, is cut to produce the passages indicated by the lines in FIGURE 1. A similar but imperforate flat sheet of material is placed above sheet 10 and another similar imperforate sheet of material is placed below it. The structure thereby achieved is a pattern of passageways for a fluid. At various locations in the pattern appear fluid supply ports such as 12. These supply ports are aligned with transverse passages pierced through the upper and/or lower flat sheets of material (not shown in FIGURE 1). To the transverse passages thus formed is connected a source of pressurized fluid which, when the timer is in operation, will continually deliver a flow of pressurized fluid.

Oscillator 14 is a multivibrator type using positive feedback from the output to control ports. Fluid from supply port 12 flows through passage 16 and then into left passage 18 or right passage 20. In accordance with the Coanda effect, the flow will not be split, but will establish itself in only one of these two passages.

Assuming the flow is through left passage 18, a portion of this flow will be deflected into feedback passage 22, with the remainder continuing down passage 18. The fluid in feedback passage 22 passes through orifice 24 and impinges on the fluid flowing from passage 16, causing this main flow to be deflected into right passage 20.

In a similar manner, a portion of the fluid in right passage 20 will be deflected into feedback passage 26, and then be emitted from orifice 28 to impinge on the fluid flowing from passage 16. In both right and left passages 18 and 20 respectively, the major portion of the fluid flowing continues down the passage to orifices 30 and 32. Orifices 30 and 32, therefore, alternately emit fluid pressure pulses. The pulses thus produced are periodic, but are temperature sensitive, i.e., the frequency changes with changes in temperature. If the system and fluid supply are maintained at a constant temperature, this is not a problem. It should be noted that the oscillator described is only used as an example, and that other fluid oscillators may be used.

It has been desirable, and sometimes necessary, in the construction of fluid elements to provide for amplification of the signals which are produced. The output signals of oscillator 14 are amplified by utilizing an additional fluid supply port 34, which may be connected to the same source previously referred to.

When the timer is started, fluid is delivered from supply port 34 to passage 36. In the usual fluid element, this fluid would be delivered to output passage 38 or exhaust passage 40. It is possible to so design an amplifier element that flow would always be initially down a selected one of these two passages, but with such a special design, the passage could not be varied as desired.

In accordance with this invention, the amplifier of the oscillator, as well as that of each binary counter stage, is provided with a means for selecting the output or exhaust passage as desired, either initially or after the timer has been started. Left control port 42 and right control port 44 connected to orifices 46 and 48 respectively are provided to emit fluid which will impinge on the fluid flowing from passage 36 to deflect it into passage 40 or passage 38 respectively. The actual deflection which occurs depends upon whether fluid is supplied to control port 42 or control port 44. Of course, if fluid is supplied to control port 42 to deflect the flow into passage 40, and the flow is already in passage 40, no deflection would occur.

After flow has been established in either passage 38 or 40 as desired, the supply of fluid to the control port would be terminated. At this time the fluid pulses issuing alternately from orifices 30 and 32 would control the flow pattern and cause the fluid supplied through passage 36 to alternately flow into output passage 38 and exhaust passage 40.

The binary counter which receives the periodic fluid pulses from output passage 38 will now be described, still with reference to FIGURE 1.

The periodic amplified output signals of oscillator 14 will be delivered to input passage 50 of the first stage B1 of the multistage fluid binary counter. These signals, fluid pressure pulses, will flow down left passage 52 or right passage 54. The pulses can be made to set up a predetermined flow pattern by utilizing the amplifier associated with stage B1. The amplifier of stage B1 is provided with fluid pressure supply port 56 which is connected by passage 58 to exhaust passage 60 and output passage 62. Control ports 64 and 66, with their associated orifices 68 and 70, are provided to deflect the flow from passage 58 into exhaust passage 60 or output passage 62, respectively.

If control port 66 and its orifice 70 have been used to cause the fluid flowing from fluid supply port 56 to flow down output passage 62, an aspiration of the fluid contained in left passage 52 of first stage B1 occurs. A lower pressure consequently exists in left passage 52 than in right passage 54, and the first signal emitted from input passage 50 will flow into left passage 52. This signal is emitted from orifice 72 and deflects the fluid from passage 58 into exhaust passage 60. This flow pattern causes a reduced pressure in right passage 54 which causes the next fluid signal pulse delivered to first stage B1 to flow down right passage 54 and be emitted from orifice 74. The fluid from passage 58 is thus deflected into output passage 62 to be delivered to second stage B2 of the multistage binary counter.

Second stage B2 comprises input passage 76, right passage 78, left passage 80, and right and left orifices 82 and 84. Amplification of the signals transmitted by second stage B2 is achieved through fluid supply port 86 and passage 88. The amplified signals of second stage B2 will be delivered alternately to exhaust passage 90 and output passage 92 with the initial passage being selected by the use of control ports 94 and 96. All these operate in a manner similar to that described for first stage B1.

The last stage BN of the multistage binary counter has input passage 98, right passage 100, left passage 102, fluid supply port 104, control ports 106 and 108, exhaust passage 110, and output passage 112. Stage BN operates in a manner similar to the other stages except its output passage 112 delivers a fluid pressure pulse to a transducer or other device which is to perform a function at the end of the measured time.

The number of stages actually utilized depends on the total time which the timer is required to measure. For example, a timer may be required which will measure any time interval from two to two hundred seconds. If an oscillator is designed to produce output pulses at a rate of 0.5 pulse per second (p.p.s.), the multistage counter should be able to count 100 pulses. Thus, 100 p./0.5 p.p.s=200 seconds. Seven stages of a multistage binary counter provide a capacity of $2^7=128$ pulses, or 156 seconds. Then, to measure an interval of 200 seconds, the timer would be started with an initial setting of 56 seconds and would deliver an output pulse from output passage 112 after 200 seconds.

As previously described, a fluid timer can be fabricated by cutting passages in one flat sheet, and providing additional flat sheets on either side to enclose the passages. The resulting construction would then be similar to FIGURE 2 in which parts corresponding to those in FIGURE 1 are numbered the same.

Sheet 10, in which the passages described have been cut, is placed between a back sheet 11 and a front sheet 13. Exhaust passages, such as exhaust passage 40 of oscillator 14 and exhaust passage 90 of stage B1, are open at the top of sheet 10, with additional exhaust passages, not shown in FIGURE 2, opening from the bottom.

A source of pressurized fluid 15 is connected to the fluid supply ports, such as 34 and 56, by a tube 17. To each of the control ports is connected a tube through which pressurized fluid may be supplied. For example, control ports 66 and 68 have tubes 19 and 21, respectively, connected to them. Valve 23 is connected to tube 19 to provide a means for controlling the flow of fluid through that tube. Similar valves are provided for the other tubes as shown. The upper control ports such as 42 and 44 are also provided with tubes and valves, not shown to simplify the drawing.

Those control ports to which it is desired to supply fluid to set the time would have their associated valves connected to the source of pressurized fluid 15. The valves of the remaining control ports would be closed.

Since the timer system will ordinarily contain fluid at a higher pressure than atmospheric, in some cases control of the flow path can be achieved by opening one control port valve to the atmosphere instead of providing pressure to the opposite control port.

The output signal from the fluid timer will be emitted from output passage 112. This passage would be connected by tubing to the transducer or other utilizing device.

Figure 3:
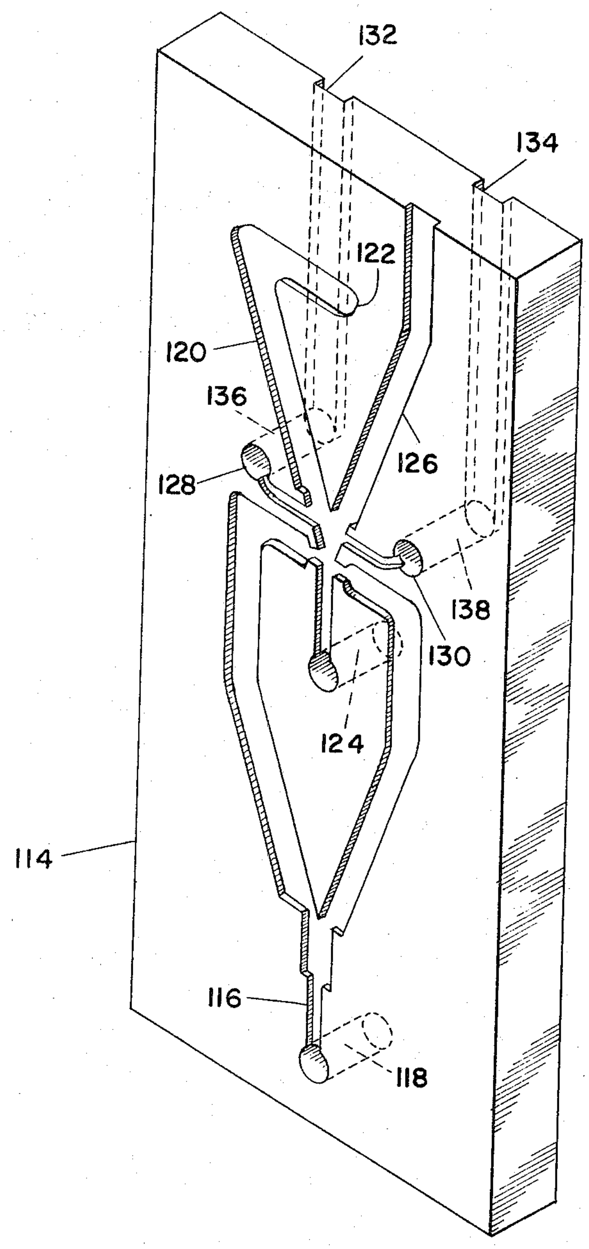
FIGURE 3 is a schematic isometric of an alternate construction of a counter stage.

Although the construction shown in FIGURES 1 and 2 is practical for timers having a small number of stages, an alternate construction may be desirable for some purposes. In FIGURE 3, one counter state is fabricated on a separate flat sheet 114. This stage operates in the same manner as those shown in FIGURE 1, but the passages are here only grooves on one side of sheet 114. The number of stages required can then be stacked together with an oscillator similarly constructed to form a timer.

Input passage 116 is connected to the output of the previous stage by transverse passage 118 passing through sheet 114. Output passage 120 is continued to a central position 122 so that it will be aligned with the input of the next stage. It should be noted that, as in FIGURE 1, adjacent stages are inversely positioned. The source of pressurized fluid is connected to the counter stage by transverse passage 124.

Exhaust passage 126 opens at the top of sheet 114. Control ports 128 and 130 may be connected to supply fluid from the top of sheet 114 by passages 132 and 134 respectively on the reverse side of sheet 114, and transverse passages 136 and 138 respectively. Passages 132 and 134 could be grooves on the obverse surface of sheet 114 instead of the reverse surface as shown. The arrangement shown permits a narrower counter although it adds to the length. Passages 132 and 134 could also be cut in the obverse surface of the preceding stage.

It is obvious that other changes and modifications can be made without departing from the spirit of the invention and the scope of the appended claims.

What is claimed as new and desired to be secured by Letters Patent of the United States is:

1. A fluid timer comprising:

a source of pressurized fluid;

a multistage fluid binary counter, each stage of said counter having a stage input passage, a pair of divergent signal input passages joined at their upstream ends to said input passage, and
a fluid amplifier portion including a supply port connected to said source, the downstream ends of said divergent signal input passages terminating in signal input orifices or said fluid amplifier portion;
a fluid oscillator connected to said source;
said fluid oscillator producing periodic fluid pulses;
means for delivering said fluid pulses to the input passage of the first stage of said binary counter; and
means for setting each stage of said binary counter to either of its two operating states, said setting means comprising a pair of ports having control orifices emitting fluid pulses, alternatively, said control orifices being associated with the signal input orifices in the fluid amplifier portion of each counter stage to control the output of the respective stages.

2. A fluid timer comprising:
a source of pressurized fluid;
a multistage fluid binary counter, each stage of said counter having
a stage input passage,
a pair of divergent signal input passages joined at their upstream ends to said input passage,
a fluid amplifier portion including a supply port connected to said source and a pair of output passages, the downstream ends of said divergent signal input passages terminating in signal input orifices of said fluid amplifier portion;
a fluid oscillator connected to said source;
said fluid oscillator producing periodic fluid pulses;
means for delivering said fluid pulses to the input passage of the first stage of said binary counter;
means including a pair of ports having control orfices emitting fluid pulses, alternatively, said control orifices being associated with the signal input orifices in the fluid amplifier portion of each counter stage to initially cause the fluid flowing through each stage to be emitted from a selected one of said pair of output passages.

3. A fluid timer comprising:
a source of pressurized fluid;
a multistage fluid binary counter, each stage of said counter having
a stage input passage,
a pair of divergent signal input passages,
a fluid pressure supply port connected to said source,
a pair of output passages, wherein the upstream ends of said divergent signal input passages join said stage input passage, the downstream ends thereof terminating in signal input orifices, and wherein said signal input orifices, said supply port and said output passages provide a fluid amplifier portion of said stage;
a fluid oscillator producing periodic fluid pulses connected to said source;
means for delivering said fluid pulses to the input passage of the first stage of said counter;
said timer having an output passage from which a pulse will be emitted when the full counting capacity of the counter has been used; and
means for initally setting said counter to a desired count less than its full capacity, said setting means comprising pairs of ports having control orifices emitting fluid pulses, alternatively, said control orifices being associated with the signal input orifices in the fluid amplifier portion of each stage, whereby the timer output pulse will be emitted when a count equivalent to the difference between its full capacity and said desired count is received.

4. A fluid timer comprising:
a source of pressurized fluid;
a multistage fluid binary counter, each stage of said counter having
a stage input passage,
a pair of divergent signal input passages joined at their upstream ends to said input passage,
a fluid amplifier portion including a supply port, connected to said source and a pair of output passages, the downstream ends of said divergent signal input passages terminating in signal input orifices of said fluid amplifier portion;
one stage of said counter having its fluid passages in a first plane;
another stage of said counter having its fluid passages in a plane parallel to but spaced from said first plane;
a fluid oscillator producing periodic fluid pulses connected to said source;
means for delivering said fluid pulses to the input passage of the first stage of said binary counter; and
means including a pair of ports having control orifices emitting fluid pulses, alternatively, said control orifices being associated with the signal input orifices in the fluid amplifier portion of ach counter stage to initially cause the fluid flowing through each stage to be emitted from a selected one of said pair of output passages.

References Cited by the Examiner

UNITED STATES PATENTS

| | | | |
|---|---|---|---|
| 3,057,551 | 10/1962 | Etter | 235—201 |
| 3,075,548 | 1/1963 | Horton | 235—201 |
| 3,093,306 | 6/1963 | Warren | 235—201 |
| 3,114,390 | 12/1963 | Blattli | 235—201 X |
| 3,128,039 | 4/1964 | Norwood | 235—201 |
| 3,193,197 | 7/1965 | Bauer | 235—201 |
| 3,244,370 | 4/1966 | Colston | 235—201 |

OTHER REFERENCES

Mitchell et al.: "Fluid Logic Devices and Circuits," Transactions of the Society of Instrument Technology, Feb 26, 1963, pages 11–14.

Katz: "Proportional Fluid Control," Fluid Amplification Symposium, Diamond Ordnance Fuze Lab., 1962, pages 21–36.

RICHARD B. WILKINSON, *Primary Examiner.*

LEO SMILOW, *Examiner.*

W. F. BAUER, *Assistant Examiner.*